3,331,874
BISTRIFLUOROMETHYL ANILIDES
Herbert C. Stecker, 113 Hollywood Ave.,
Ho-Ho-Kus, N.J. 07423
No Drawing. Filed May 29, 1962, Ser. No. 198,426
2 Claims. (Cl. 260—562)

This invention deals with novel multi(trifluoromethyl) anilide compounds and with germicidal compositions obtained therewith. More specifically, it relates to compounds having at least two trifluoromethyl groups in the anilide portion of the molecule.

In recent years, there has been a demand for a long-lasting germicide which could be used with efficiency in fibrous materials, such as cloth, leather, paper, and the like, as well as in plastic materials of the type of rubber, polyethylene, polyurethane, nylon, and the like. This means that the germicide must be difficult to leach out, and yet be highly effective in destroying fungi and bacilli. Germicidal anilide compounds having a single trifluoromethyl group have been described in the art, but these materials possess excessive solubility for many household and industrial applications.

According to this invention, a series of new compounds has been prepared which fulfills the requirements set forth hereinabove, and which are not excessively priced for wide-spread commercial uses. These compounds have the general empirical formula as follows:

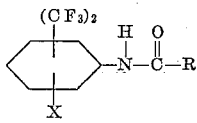

where X is a substituent of the class consisting of hydrogen, $CF_3$, halogen, such as chlorine, bromine, iodine and fluorine, and $R_1CF_3$ in which $R_1$ is an alkyl group having 1 to 4 carbon atoms, and R is a radical of the class consisting of substituted and unsubstituted alkyl, aryl, alkaryl and aralkyl groups having no more than 12 carbon atoms. For example, R may be a benzyl group, a phenyl group, a salicylic group, or either group containing one to three substituents, such as OH, halogen (e.g., Cl, Br, I, F), $CH_3$, $C_2H_5$, $C_3H_7$, $C_4H_8$, $C_5H_{10}$ or $(CH_2)_nCH_3$, in which $n$ is an integer having a value up to 5, —COONa, —COOK, $NO_2$, and the like, or R may be an alkyl group such as $CH_3$, $C_2H_5$, $C_3H_7$, $C_4H_{10}$ or $(CH_2)_{11}CH_3$ or $(CH_2)_nCH_3$, wherein $n$ is an integer having a value up to 11, which latter alkyl groups may be substituted with one or more substituents such as halogen (e.g., Cl, Br, I, F), OH, $NO_2$, $CF_3$, COONa, COOK, and the like.

These compounds may be prepared in the following manner:

EXAMPLE

3'5'-bistrifluoromethyl salicylanilide

Forty-six parts by weight of 3',5'-bistrifluoromethyl aniline and twenty-eight parts of salicylic acid are added to 450 parts of chlorobenzene, and 12 parts of phosphorus trichloride are then added with 1 part of aluminum chloride. The mixture is refluxed until hydrogen chloride ceases to be generated, after which water is added and the mixture made alkaline with trisodium phosphate. The chlorobenzene is steam distilled from the mixture and the product is removed by filtration.

Similar products may be obtained by using, for example, 2-chloro-3,5-bistrifluoromethyl aniline and trifluoro acetic acid to produce 2-chloro-3',5'-bistrifluoromethyl trifluoroacetanilide.

Examples of such compounds of the present invention include nitrosalicyl-3',5'-bistrifluoromethyl anilide, 2-halo-3',5'-bistrifluoromethyl acetanilide, 3',5'-bistrifluoromethyl fluoropropionylanilide, 2',3',5'-tristrifluoromethyl salicylanilide, and the like.

The compounds of the present invention have been tested for antimicrobial activity as follows:

Serial dilutions were made with each germicide and each concentration level was tested in triplicate against the designated microorganism in a nutrient broth medium to determine the minimum concentration required to inhibit growth of the microorganism. The presence or absence of growth was determined by the development of a haze or cloud in the otherwise clear growth medium and no attempt was made to determine whehter the microorganism was killed or merely inhibited in its growth.

Table I gives a list of various compounds made in accordance with the present invention, as well as some of their properties, and their anti-microbial activity against S. aureus and S. choloraesuis.

These compounds have been found to be excellent mildew-proofing and germicidal agents for fibrous materials such as cloth, leather, paper, wood, and the like. Treatment of fibrous material may be made with a solution or dispersion of the germicide in a liquid medium, leaving about 0.001% to 0.05%, or even 0.5%, or as much as 5.0% by weight of the germicide in the fibrous material.

The germicides of the present invention also may be incorporated in plastics, such as rubber, polyethylene, polystyrene, polyurethane, nylon, and similar plastoform and elastoform compositions by incorporating the germicide in an amount of 0.001% to 0.05% or even 0.1% or as much as 0.5% and 5.0% in the batch which is mixed or kneaded prior to vulcanization, extrusion or other forming operation.

The compounds of the present invention are particularly valuable in detergent and toilet detergent compositions, in the amount of 0.001% to 0.01% by weight, and to about 0.5% or even 1.0%, 2%, 5% or even 10%. They may be admixed in commercial toilet soaps, such as neutral high grade sodium and potassium salts of fatty acids from tallow, olive oil, palm oil, and the like, above or with non-soap synthetic detergents, e.g., non-ionic, anionic, or cationic.

The term "detergent" employed herein includes fatty acid soaps, as well as synthetic detergents, and other detergents, such as fatty alcohol sulfates, fatty acid amides, sodium tripolyphosphates, and combinations thereof. The term "toilet soap" used herein also is employed in its popular meaning, that is, those compositions employed for cleansing the skin and prepared from an alkali metal compound, such as potassium or sodium hydroxide and a fat or fatty acid, both saturated and unsaturated. The compositions described herein also include other antiseptic agents, emollients, water softeners, antioxidants, dyes, perfume, "cold cream" additives, and the like.

The germicidal compounds of the present invention may be used with anionic detergents, such as sodium hexadecyl sulfate, or with cationic detergents, as exemplified by dimethyl-stearamidopropyl-2-hydroxyethyl ammonium dihydrogen phosphate, or with non-ionic detergents, such as polyoxypropylene, polyoxyethylene condensates, alone or in admixture with other detergents heretofore enumerated. They are also effective in scouring powders, detergent cleaners, and the like.

TABLE I

| | Compound | Solubility | | | Inhibiting Antimicrobial Activity (p.p.m.) | |
|---|---|---|---|---|---|---|
| | | Water | Alcohol | Polyethylene Glycol | S. Aureus | S. Choloraesuis |
| 1 | 3,5-bis(CF₃)-phenyl-NH-CO-phenyl-NH₂ | Very Sl. Sol | Sl. Sol | Sol | 0.4 | 0.4 |
| 2 | 3,5-bis(CF₃)-phenyl-NH-CO-phenyl(OH) | Very Sl. Sol | Sl. Sol | Sol | 0.2 | 0.3 |
| 3 | 3,5-bis(CF₃)-phenyl-NH-CO-phenyl(OH)(Cl) | Very Sl. Sol | Sl. Sol | Sol | 0.1 | 0.2 |
| 4 | 3,5-bis(CF₃)-phenyl-NH-CO-phenyl(OH)(Br)₂ | Very Sl. Sol | Sl. Sol | Sol | 0.1 | 0.2 |
| 5 | Br,bis(CF₃)-phenyl-NH-CO-phenyl(OH)(Br)₂ | Very Sl. Sol | Sl. Sol | Sol | 0.1 | 0.2 |
| 6 | 3,5-bis(CF₃)-phenyl-NH-CO-phenyl(OH)(NO₂) | Very Sl. Sol | Sl. Sol | Sol | 0.1 | 0.1 |
| 7 | 3,5-bis(CF₃)-phenyl-NH-CO-phenyl(CH₃)(COONa) | Sl. Sol | Sl. Sol | Sl. Sol | 0.4 | 0.5 |
| 8 | CF₃,Cl,CF₃-phenyl-NH-CO-phenyl(OH)(CH₃) | Sl. Sol | Sl. Sol | Sol | 0.3 | 0.3 |
| 9 | 3,5-bis(CF₃)-phenyl-NH-CO-phenyl(OH)(I) | Very Sl. Sol | Sl. Sol | Sol | 0.1 | 0.2 |
| 10 | CF₃,Cl,CF₃-phenyl-NH-CO-CH₃ | Insol | Sl. Sol | Sl. Sol | 0.4 | 0.4 |
| 11 | CF₃,Cl,CF₃-phenyl-NH-CO-CF₃ | Insol | Sl. Sol | Sl. Sol | 0.2 | 0.2 |
| 12 | 3,5-bis(CF₃)-phenyl-NH-CO-CH₂CH₂F | Insol | Sl. Sol | Sl. Sol | 0.8 | 0.8 |

TABLE I—Continued

| Compound | Solubility | | | Inhibiting Antimicrobial Activity (p.p.m.) | |
|---|---|---|---|---|---|
| | Water | Alcohol | Polyethylene Glycol | S. Aureus | S. Choloraesuis |
| 13. $CF_3$-phenyl($CF_3$)($Cl$)-N(H)-C(O)-$CH_2Cl$ | Insol | Sl. Sol | Sl. Sol | 0.4 | 0.4 |
| 14. Cl,$CF_3$,$CF_3$-phenyl-N(H)-C(O)-$(CH_2)_{10}CH_3$ | Insol | Sol | Sol | 0.9 | 0.9 |
| 15. $CF_3$,$CF_3$-phenyl-N(H)-C(O)-$CH_2$-phenyl-OH | Insol | Sol | Sol | 0.8 | 0.9 |

I claim:
1. The compound 2-halo-3′,5′-bis (trifluoromethyl) acetanilide.
2. The compound 3′,5′-bis (trifluoromethyl) fluoropropionylanilide.

References Cited

UNITED STATES PATENTS

| | | | |
|---|---|---|---|
| 2,226,672 | 12/1940 | Smith | 260—562 X |
| 2,315,064 | 3/1943 | Littman | 167—38.6 |
| 2,572,067 | 10/1951 | Smith | 260—562 X |
| 2,746,928 | 5/1956 | Darragh et al. | 252—106 |
| 2,797,999 | 7/1957 | Klein | 106—15 |
| 2,906,711 | 4/1958 | Stecker | 252—106 |
| 2,912,460 | 11/1959 | Ehrhart et al. | 260—562 |
| 2,919,200 | 3/1959 | Dubin et al. | 106—15 |
| 2,967,885 | 1/1961 | Lamberti | 260—559 |
| 3,058,881 | 10/1962 | Wilde | 167—38.6 |

OTHER REFERENCES

Drake et al. Jour. Amer. Chem. Soc., vol. 68, pp. 1603–4 (1946).

Chemical Abstracts Subject Index A–I, vol. 52, p. 205 (1958).

WALTER A. MODANCE, *Primary Examiner.*

I. MARCUS, *Examiner.*

R. L. PRICE, N. TROUSOF, *Assistant Examiners.*